United States Patent
Devall

(10) Patent No.: US 7,270,117 B1
(45) Date of Patent: Sep. 18, 2007

(54) FUEL TANK VENT APPARATUS

(75) Inventor: Jeffrey E. Devall, Greenup, IL (US)

(73) Assignee: Stant Manufacturing Inc., Connersville, IN (US)

( * ) Notice: Subject to any disclaimer, the term of this patent is extended or adjusted under 35 U.S.C. 154(b) by 0 days.

(21) Appl. No.: 11/420,411

(22) Filed: May 25, 2006

(51) Int. Cl.
*F02M 37/20* (2006.01)
*F02M 37/22* (2006.01)

(52) U.S. Cl. .................................... 123/516

(58) Field of Classification Search ............. 123/516, 123/518, 519, 514; 137/202, 43, 38, 39
See application file for complete search history.

(56) References Cited

U.S. PATENT DOCUMENTS

| | | |
|---|---|---|
| 4,753,262 A | 6/1988 | Bergsma |
| 5,313,977 A | 5/1994 | Bergsma et al. |
| 5,404,907 A | 4/1995 | Benjey et al. |
| 5,755,252 A | 5/1998 | Bergsma et al. |
| 6,848,463 B2 * | 2/2005 | Johansen .................. 137/202 |
| 6,866,058 B1 | 3/2005 | Brock et al. |

* cited by examiner

*Primary Examiner*—Mahmoud Gimie
(74) *Attorney, Agent, or Firm*—Barnes & Thornburg LLP

(57) ABSTRACT

A vent apparatus includes a vent housing adapted to be mounted on a fuel tank to extend into an interior region of the fuel tank and a fuel vapor discharge conduit leading from the vent housing to a fuel vapor recovery canister. The vent apparatus further includes a discharge regulator configured to regulate flow of fuel vapor from the vent housing into the fuel vapor discharge conduit.

22 Claims, 8 Drawing Sheets

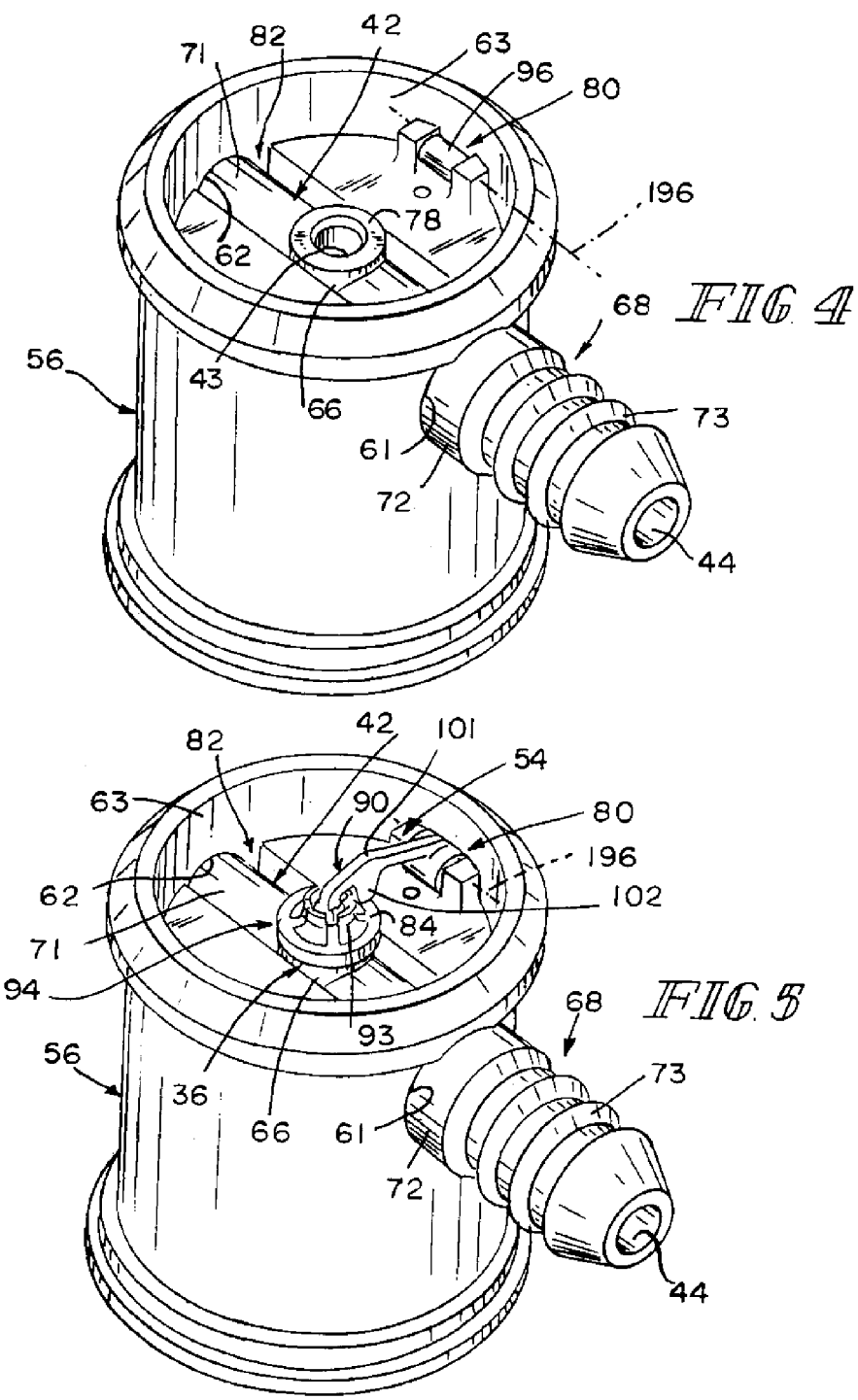

FUEL TANK VENT APPARATUS

BACKGROUND

The present disclosure relates to vent apparatus, and particularly to a fuel tank vent apparatus. More particularly, the present disclosure relates to a system for venting fuel vapor from a fuel tank while inhibiting escape of liquid fuel from the fuel tank through the vent.

SUMMARY

A vent apparatus in accordance with the present disclosure includes a vent housing, a fuel vapor discharge conduit coupled to the vent housing, and a discharge regulator associated with a conduit inlet port included in the fuel vapor discharge conduit. A conduit outlet port included in the fuel vapor discharge conduit is adapted to mate with an external conduit communicating fuel vapor to a fuel vapor recovery canister.

In illustrative embodiments, the conduit inlet port is located in an interior region of the vent housing and the conduit outlet port is located outside the interior region of the vent housing. The discharge regulator includes a port-closure valve and a valve mover associated with the port-closure valve and located in the interior region of the vent housing.

In illustrative embodiments, the port-closure valve is located in the interior region of the vent housing and arranged to confront and move relative to the conduit inlet port. The valve mover is coupled to the port-closure valve and formed to include upper and lower cams. The upper cam is arranged to engage a lid of the vent housing during movement of the port-closure valve to assume a closed position closing the conduit inlet port. The lower cam is arranged to engage the port-closure valve during movement of the port-closure valve to assume an opened position opening the port-closure valve.

Additional features of the present disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIG. 4 is an enlarged perspective view showing the fuel vapor discharge conduit nestled in the upwardly opening concave channel formed in the buoyant float and arranged to extend through the small and large conduit receivers formed in the upper sleeve that surrounds the buoyant float and showing the "opened" conduit inlet port formed in the vertical vent segment of the fuel vapor discharge conduit and the horizontal pivot rod included in the valve-mover mount located on top of the buoyant float;

FIG. 5 is a view similar to FIG. 4 showing the port-closure valve in a closed position at rest on the circular valve seat provided on the vertical vent segment to close the conduit inlet port and showing a right end of the valve mover coupled to the pivot rod using a "pivot" joint and a left end of the valve mover coupled to the port-closure valve using a "ball-and-socket" joint;

DETAILED DESCRIPTION

Figure 1:
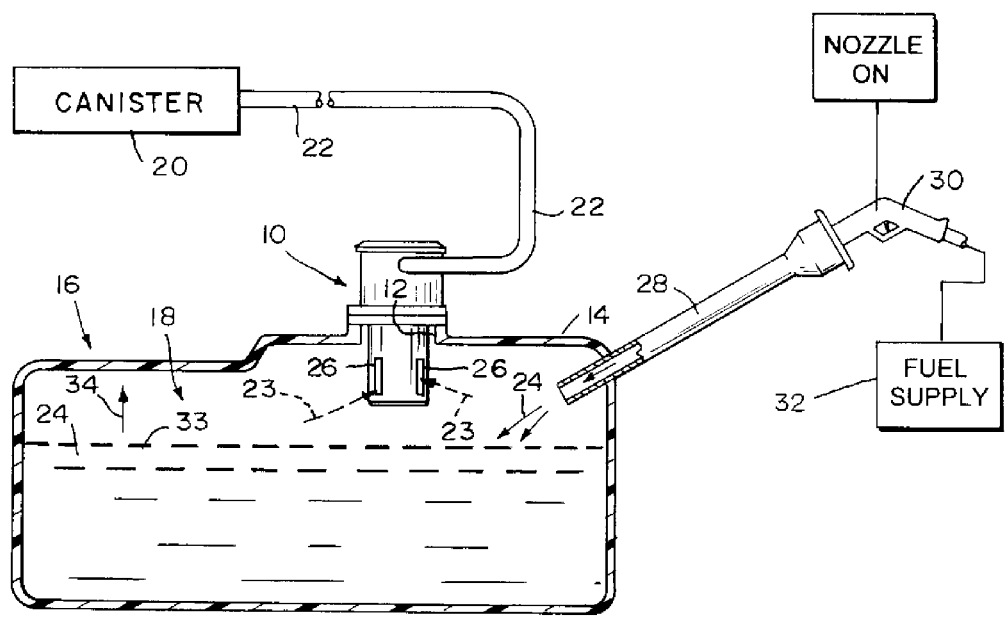
FIG. 1 is a diagrammatic view of a vehicle fuel system including a fuel tank containing liquid fuel during a fuel tank refueling operation and showing a vent apparatus coupled to a top wall of the fuel tank and configured to regulate discharge of pressurized fuel vapor from an interior region of the fuel tank to a fuel vapor recovery canister.
Figure 9:
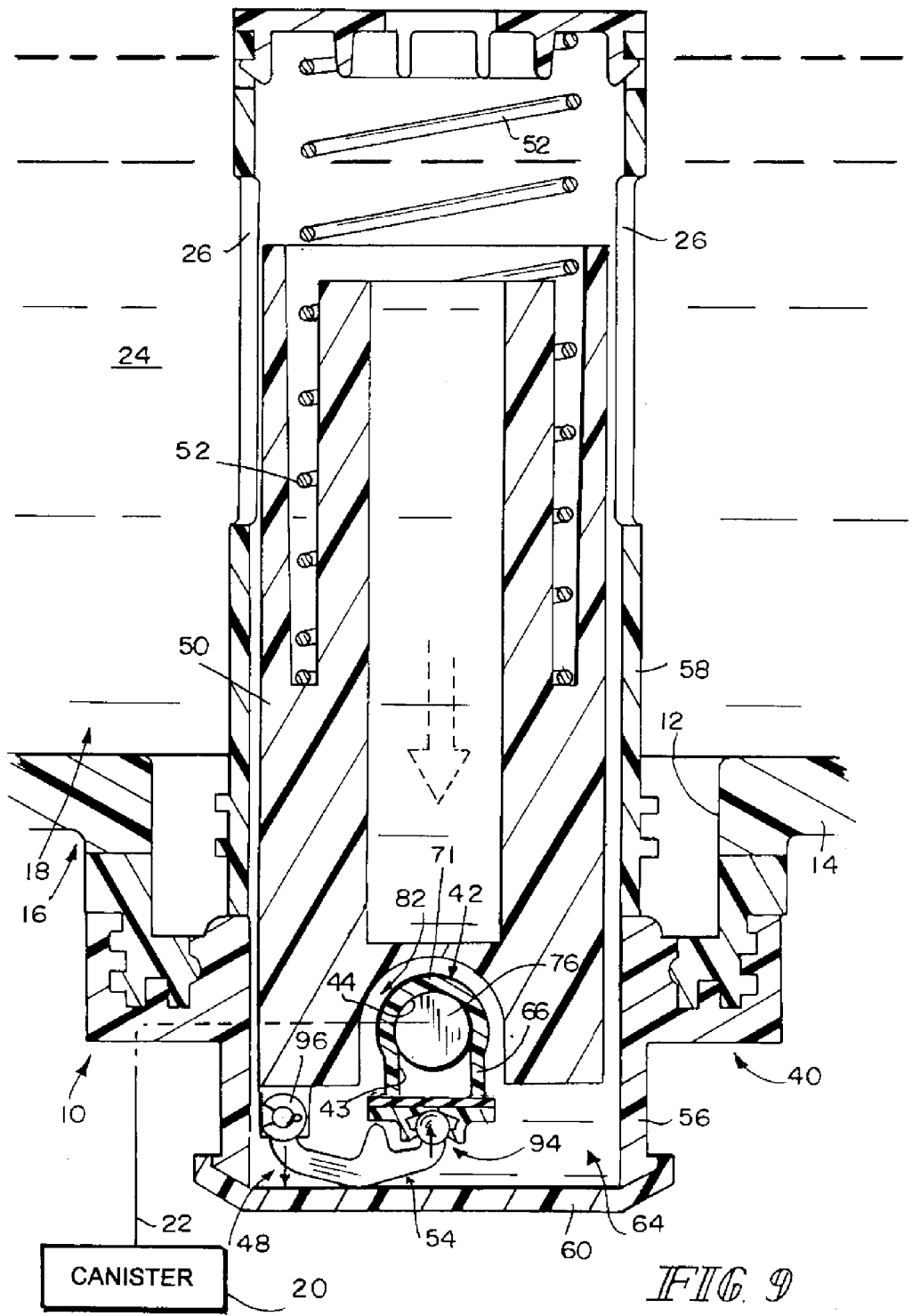
FIG. 9 is a view similar to FIG. 6 after a vehicle roll-over (as in an accident sequence) orients the fuel tank in an upside-down position, showing the upper cam included in the valve mover in contact with the underside of the lid to define a pivot point to cause the valve mover to pivot in a counterclockwise direction about the pivot axis to cause the post-closure valve to close to prevent the discharge of liquid fuel extant in the fuel tank from flowing to the canister through the vent apparatus.

A fuel tank vent apparatus 10 is mounted in an aperture 12 formed in a top wall 14 of a fuel tank 16 to regulate flow of pressurized fuel vapor from a vapor space 18 provided in tank 16 to a fuel vapor recovery canister 20 through an external conduit 22 as shown, for example, in FIG. 1. Vent apparatus 10 is configured to discharge fuel vapor 23 from vapor space 18 to canister 20 at low levels of liquid fuel 24 in fuel tank 16 as suggested in FIGS. 1 and 6. Vent apparatus 10 is also configured to block discharge of fuel vapor 23 (and liquid fuel 24) from vapor space 18 to canister 20 when (1) liquid fuel 24 rises to a high level in fuel tank and flows into vent apparatus 10 through fuel inlets 26 formed in vent apparatus as shown, for example, in FIG. 7 and (2) vent apparatus 10 is "inverted" (or at least tilted relative to an upright position in excess of a predetermined amount) during a vehicle rollover condition as shown, for example, in FIG. 9.

A filler neck 28 is coupled to fuel tank 16 and formed to include an inlet sized to receive a fuel-dispensing pump nozzle 30 as shown, for example, in FIG. 1. Nozzle 30 is coupled to fuel supply 32 and used by a pump operator to introduce liquid fuel 24 into fuel tank 16 during vehicle refueling. As tank 16 is filled during refueling, the top surface 33 of liquid fuel 24 will rise in direction 34 toward vent apparatus 10 and top wall 14 of fuel tank 16 as suggested in FIGS. 1, 6, and 7.

Figure 6:
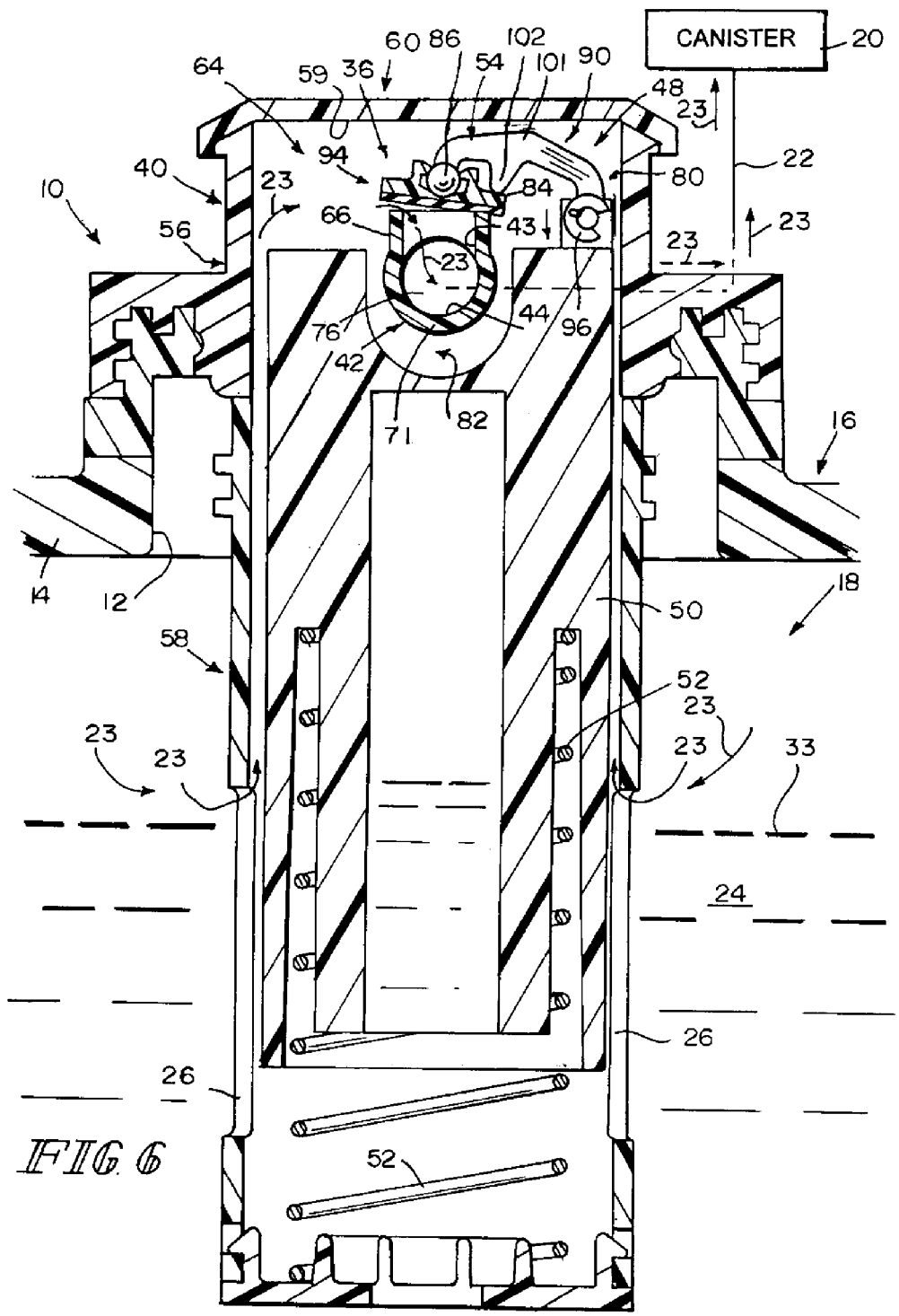
FIG. 6 is an enlarged sectional view taken along line 6-6 of FIG. 3 (after the components are assembled) showing the level of liquid fuel in the fuel tank rising during a fuel tank refueling operation and showing pressurized fuel vapor flowing from an interior region in the fuel tank through inlet windows formed in the lower sleeve into an interior region of the vent housing and past the "opened" port-closure valve into the fuel vapor discharge conduit for delivery to the canister through an external conduit.
Figure 7:
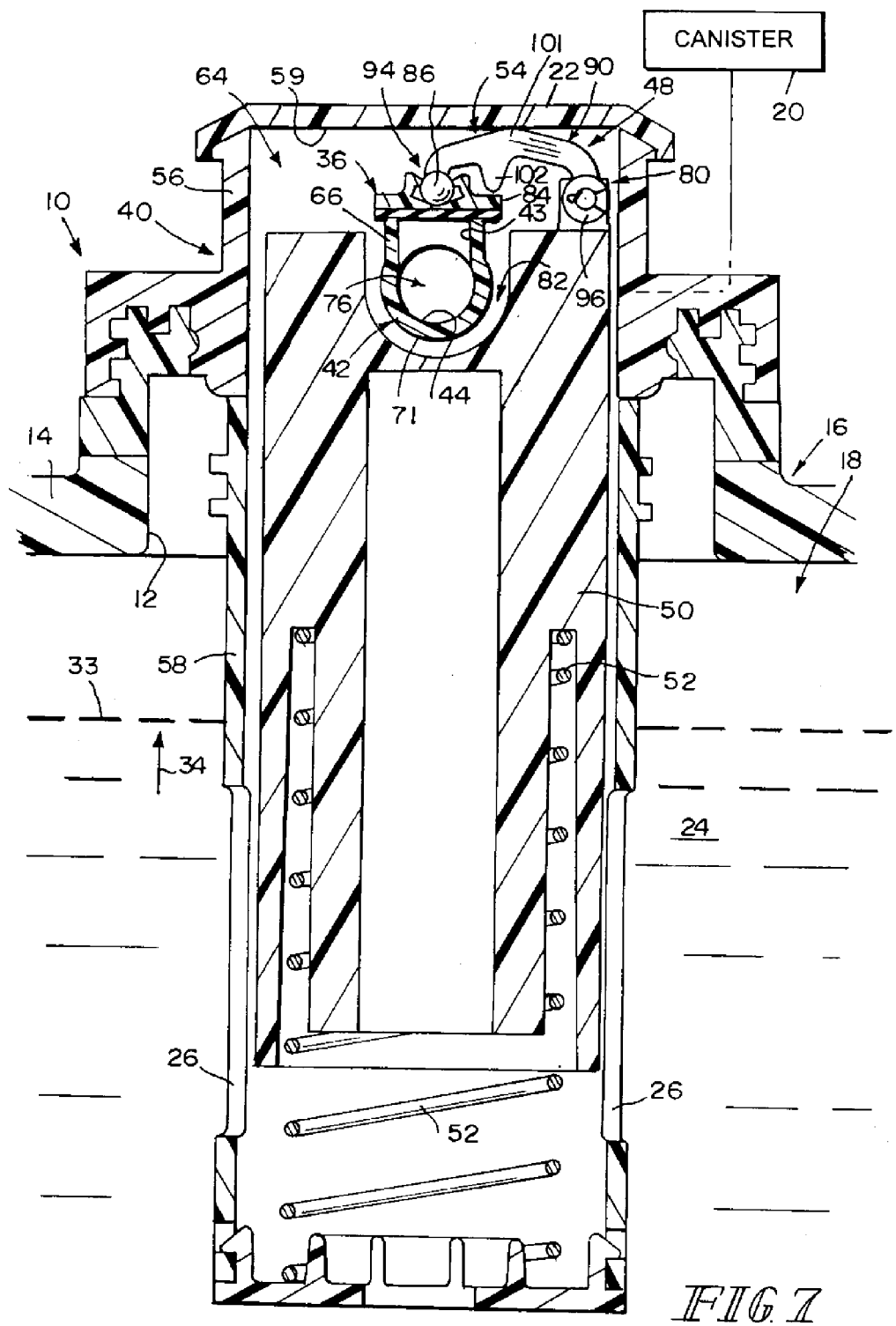
FIG. 7 is a view similar to FIG. 6 showing upward movement of the buoyant float relative to the upper and lower sleeves in response to the rising level of liquid fuel in the fuel tank and a "lifting" force applied to the buoyant float by the spring to raise the pivot rod included in the valve-mover mount upwardly relative to the upper sleeve to cause an upper cam included in the valve mover to engage a downwardly facing surface of the lid so that the valve mover pivots in a counterclockwise direction about a pivot axis established by the pivot rod to cause the port-closure valve to move downwardly to close the conduit inlet port defined by the valve seat and prevent pressurized fuel vapor extant in the fuel tank from venting to the canister through the discharge conduit.
Figure 8:
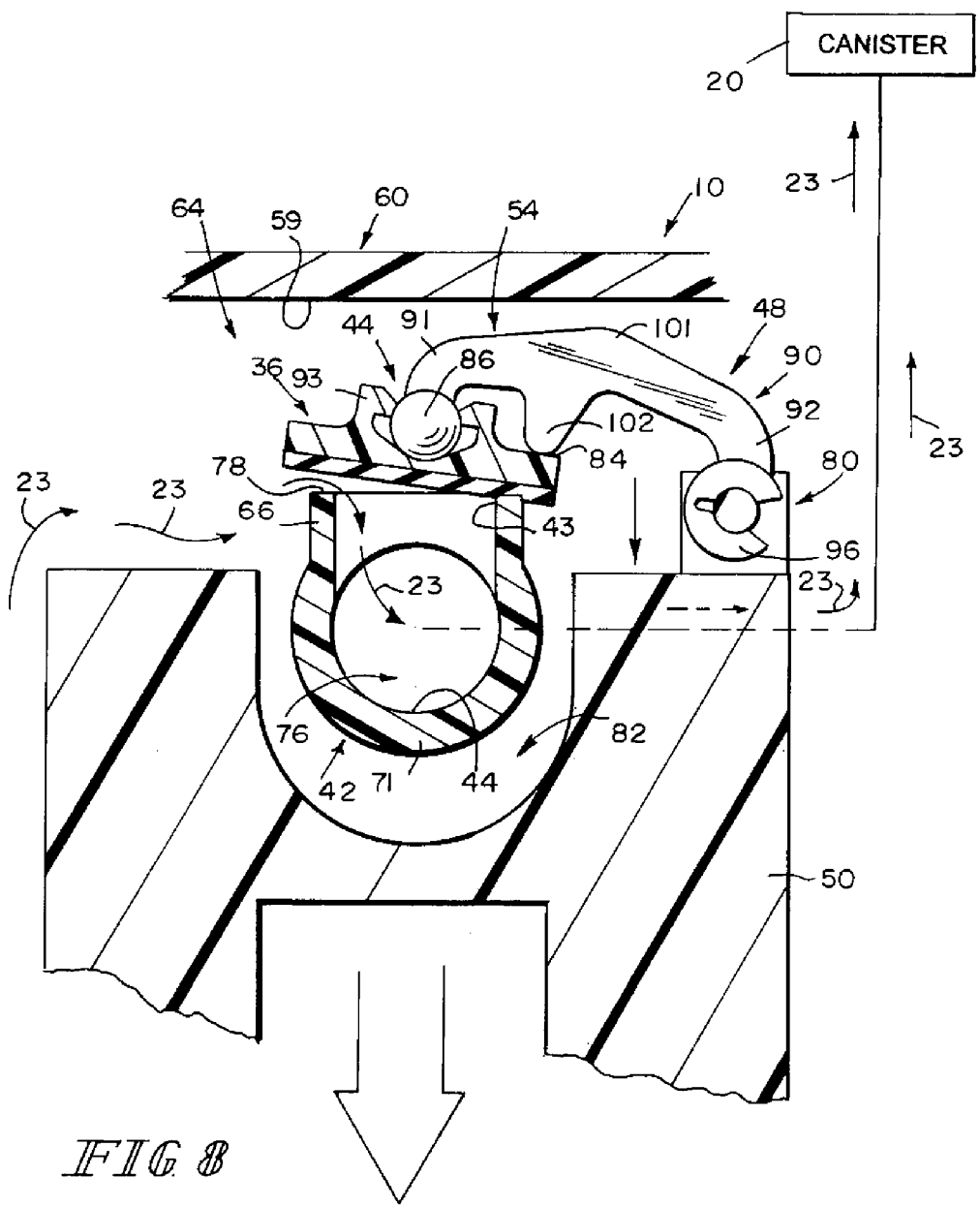
FIG. 8 is a greatly enlarged side elevation view of a portion of the vent apparatus of FIGS. 3-7, with portions broken away, showing downward movement of the buoyant float away from the underside of the lid in response to a falling liquid fuel level in the fuel tank allowing the valve mover to pivot in a clockwise direction about the pivot axis so that a lower cam included in the valve mover contacts an upwardly facing outer edge of the port-closure valve to tilt the port-closure valve on the valve seat so that a portion of the port-closure valve is disengaged from the valve seat to allow pressurized fuel vapor extant in the fuel tank to pass from the interior into the fuel vapor discharged conduit through the opened conduit inlet port and then vent to the canister through the external conduit.

Once tank 16 is filled during refueling, a port-closure valve 36 provided in vent apparatus 10 will move from an "opened" position shown in FIGS. 6 and 8 to a "closed" position shown in FIG. 7 to block further flow of pressurized fuel vapor from vent apparatus 10 to canister 20 through external conduit 22. At this stage of refueling, nozzle 30 will shut off automatically, for example. because pressurized fuel vapor 23 extant in fuel tank 16 is unable to vent to canister 20 through external conduit 20 and the pressure inside tank 16 will rise sharply to exceed the pressure of liquid fuel 24 flowing into tank 16 through filler neck 29, causing liquid fuel flow in filler neck 29 to slow or "hesitate" and splash a fill-limit sensor (not shown) provided on pump nozzle 30 to shut off fuel flow from nozzle 30.

Figure 2:
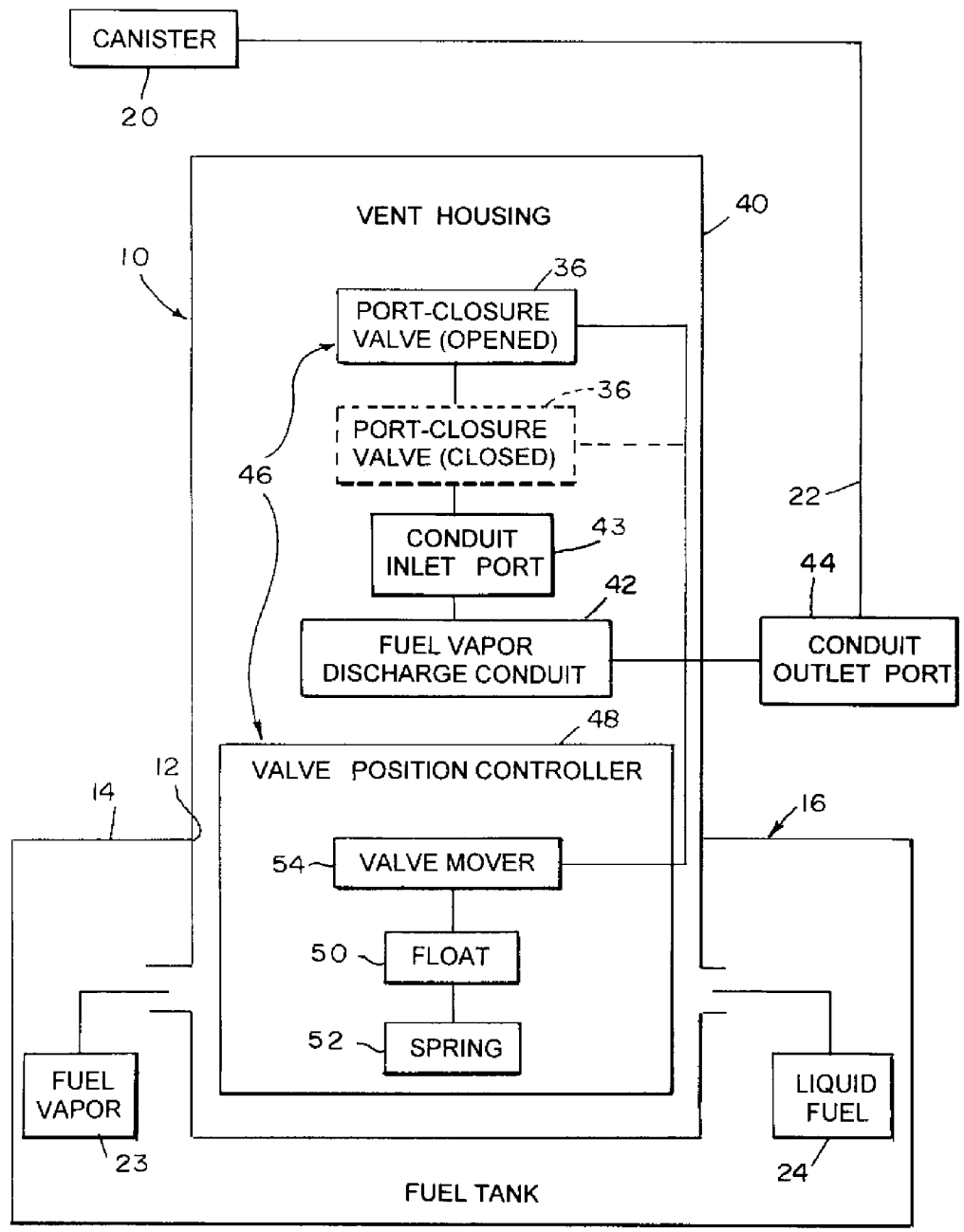
FIG. 2 is a diagrammatic view of the vehicle fuel system of FIG. 1 showing that the vent apparatus comprises a vent housing containing a fuel vapor discharge conduit and a valve-position controller for moving a port-closure valve relative to a conduit inlet port formed in the fuel vapor discharge conduit between an opened position (shown in solid) allowing fuel vapor exiting the fuel tank and entering the vent housing to flow through the conduit inlet port into the fuel vapor discharge conduit on its way to the fuel vapor-recovery canister and a closed position (shown in phantom) blocking flow of fuel vapor exiting the fuel tank and entering the vent housing through the conduit inlet port into the fuel vapor discharge conduit.

An illustrative embodiment of vent apparatus 10 is shown diagrammatically in FIG. 2. Vent apparatus 10 comprises a vent housing 40 adapted to be mounted in aperture 12 formed in fuel tank 16, a fuel vapor discharge conduit 42 having conduit inlet and outlet ports 43, 44, and a discharge regulator 46 including port-closure valve 36 and a valve position controller 48. Discharge regulator 46 provides means for sensing the amount of liquid fuel 24 extant in vent housing 40 and moving port-closure valve 36 automatically to a closed position closing conduit inlet port 43 whenever the level of liquid fuel 24 in vent housing 40 rises to a predetermined level during, for example, vehicle refueling or rollover.

In an illustrative embodiment shown in FIGS. 3 and 6-9, valve position controller 48 includes a buoyant float 50 mounted for up-and-down movement in vent housing 40 on rising and falling levels of liquid fuel 24 admitted into vent housing 40 through fuel inlets 26, a spring 52 for assisting in lifting buoyant float 50 whenever buoyant float 50 is exposed to rising levels of liquid fuel 24, and a valve mover 54 interconnecting buoyant float 50 and port-closure valve 36. In operation, as suggested in FIGS. 2, 6, and 8, upward movement of buoyant float 50 in vent housing 10 in response to rising levels of liquid fuel urges valve mover 54 to move port-closure valve 36 to assume an opened position (shown in solid in FIG. 2) opening conduit inlet port 43. Likewise, as suggested in FIGS. 2 and 7, downward movement of buoyant float 50 in vent housing 10 in response to falling levels of liquid fuel 24 urges valve mover 54 to move port-closure valve 36 to assumed a closed position (shown in phantom in FIG. 2) closing conduit inlet port 43.

In illustrative embodiments, buoyant float 50 is used to sense and react to rising and falling levels of liquid fuel 24 in vent housing 40. It is within the scope of the present disclosure to use other suitable liquid level sensors in or with vent housing 40 including electronic liquid level sensors and valve moving apparatus of the type disclosed in U.S. Pat. No. 6,199,574, which patent is incorporated by reference herein.

Figure 3:
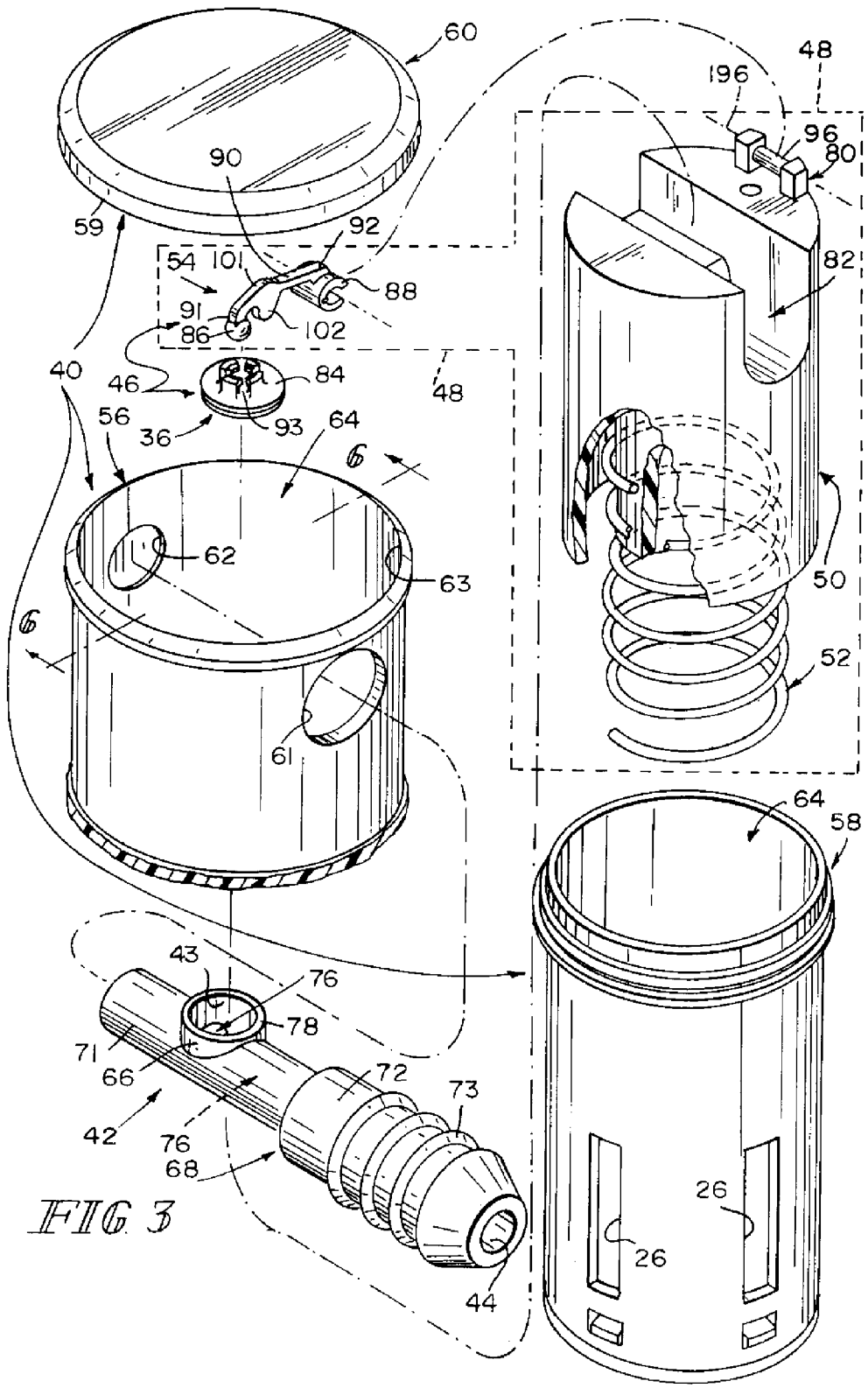
FIG. 3 is an exploded perspective view of components of the vent apparatus of FIG. 1 showing (from top to bottom) a lid included in the vent housing, a valve mover included in the valve-position controller and adapted to be coupled to an underlying port-closure valve on one end using a ball-and-socket joint and to an adjacent pivot rod on an opposite end, an upper sleeve included in the vent housing and formed to include a pair of small and large conduit receivers, a fuel vapor discharge conduit formed to include a horizontal outlet pipe adapted to extend through the conduit receivers formed in the upper sleeve and a vertical (upright) vent segment coupled to the outlet pipe and formed to include a conduit inlet port surrounded by a circular valve seat and adapted to be closed by the port-closure valve (as shown in FIG. 6), a cylinder-shaped buoyant float included in the valve-position controller and coupled to an overlying valve-mover mount including the pivot rod and formed to include an upwardly opening concave channel sized to receive a portion of the horizontal outlet pipe and a downwardly opening spring-receiving cavity, a compression spring also included in the valve-position controller and arranged to extend upwardly into the spring-receiving cavity formed in the buoyant float, and a lower sleeve included in the vent housing and arranged to underlie and cooperate with the upper sleeve and the lid (as shown in FIG. 6) to form the vent housing and to define an interior region sized to receive the port-closure valve, a portion of the fuel vapor discharge conduit, and valve-position controller therein.

As suggested in FIG. 3, vent housing 40 includes an upper sleeve 56 that mates with a lower sleeve 58 and a lid 60. Lid 60 is coupled to upper sleeve 56 to close a top opening 63 formed in upper sleeve 56. Lid 60 cooperates with upper and lower sleeves 56, 58 to form an interior region 64 of vent housing 40 as shown, for example, in FIG. 6. Lower sleeve 58 is formed to include fuel inlets 26 in the illustrated embodiment. Upper sleeve 56 is formed to include first and second conduit receivers 61, 62, which receivers are apertures in the illustrated embodiment. Discharge regulator 46 is located in interior region 64 of vent housing 40 in the illustrated embodiment.

Fuel vapor discharge conduit 42 includes a vertical vent segment 66 formed to include conduit inlet port 43 and an outlet pipe 68 coupled to vertical vent segment 66 and formed to include conduit outlet port 44 as shown in FIG. 3. Vertical vent segment 66 and outlet pipe 68 cooperate to form a vent passageway 76 interconnecting conduit inlet and outlet ports 43, 44 in fluid communication. In an illustrative embodiment, outlet pipe 68 includes (in sequence) a lateral tube segment 71 coupled to vertical vent segment 66, a throat segment 72, and a hose-connector segment 73 formed to include conduit outlet port 44 and adapted to mate with external conduit 22.

Fuel vapor discharge conduit 42 is coupled to upper sleeve 56 as suggested in FIGS. 3 and 6 to cause conduit inlet port 43 to lie in interior region 64 and conduit outlet port 44 to lie outside interior region 64. In the illustrated embodiment, vertical vent and lateral tube segments 66, 71 lie in interior region 64 and hose-connector segment 73 lies outside interior region 64 as suggested in FIG. 6. In an illustrative embodiment, throat segment 72 is positioned to lie in first conduit receiver 61 and a distal end of lateral tube segment 71 is positioned to lie in second conduit receiver 62 to support outlet pipe 68 in a stationary position relative to vent housing 40 as suggested in FIGS. 3 and 4.

Port-closure valve 36 is located in interior region 64 of vent housing 40 and arranged to confront conduit inlet port 43 as suggested in FIGS. 5 and 6. Valve position controller 48 is located in interior region 64 of vent housing 40 and exposed to liquid fuel 24 admitted into interior region 64 through fuel inlet 26. Valve position controller 48 is coupled to port-closure valve 36 and configured to move port-closure valve 36 between (1) an opened position (shown in FIG. 6) allowing fuel vapor 23 extant in interior region 64 to flow into a vent passageway 76 formed in fuel vapor discharge conduit 42 through conduit inlet port 43 and exit fuel vapor discharge conduit 42 through conduit outlet port 44 located outside interior region 64 of vent housing 40 when the amount of liquid fuel 24 extant in interior region 64 of vent housing 40 falls below a predetermined amount and (2) a closed position (shown in FIG. 7) blocking flow of fuel vapor 23 extant in interior region 64 of vent housing 40 into vent passageway 76 formed in fuel vapor discharge conduit 42 through conduit inlet port 43 when the amount of liquid fuel 24 extant in interior region 64 of vent housing 40 exceeds the predetermined amount.

Vent housing 40 is formed to include a second conduit receiver 62 and fuel vapor discharge conduit 42 is also arranged to extend into second conduit receiver 62 to support fuel vapor discharge conduit 42 in a fixed position relative to vent housing 40 as suggested in FIGS. 3 and 4. Fuel vapor discharge conduit 42 includes a lateral tube segment 71 arranged to extend into second conduit receiver 62, a vertical vent segment 66 coupled to lateral tube segment 71 and formed to include conduit inlet port 43, a hose-connector segment located outside interior region 64 of vent housing 40 and formed to include conduit outlet port 44, and a throat segment 72 arranged to interconnect lateral tube segment 71 and hose-connector segment 73 and extend through first conduit receiver 61 formed in vent housing 40. In an illustrative embodiment, vertical vent segment 66, lateral tube segment 71, throat segment 72, and hose-connector segment 73 cooperate to form vent passageway 76.

First conduit receiver 61 is round and has a first inner diameter that is about equal to an outer diameter of a cylindrical portion of throat segment 72 extending through first conduit receiver 61 as suggested in FIG. 3. Second conduit receiver 62 is round and has a smaller second inner diameter that is about equal to an outer diameter of a cylindrical portion of lateral tube segment 71 extending into second conduit receiver 62 as also suggested in FIG. 3.

Vertical vent segment 66 is located in a position between lateral tube segment 71 and lid 60 as shown in FIG. 6. Vertical vent segment 66 is arranged to extend in an upward direction from lateral tube segment 71 toward lid 60 and is configured to terminate at an annular valve seat 78 surrounding conduit inlet port 43 and facing toward lid 60. Port-closure valve 36 is positioned to lie between annular valve seat 78 and lid 60.

Outlet pipe 68 is arranged to extend in a horizontal direction through first conduit receiver 61 and formed to include conduit outlet port 44 as suggested in FIGS. 3 and 4. Vertical vent segment 66 is coupled to outlet pipe 68 and formed to include conduit inlet port 43 and arranged to lie in perpendicular relation to outlet pipe 68.

Valve position controller 48 includes a buoyant float 50 located in interior region 64 of vent housing 40 and configured to float in liquid fuel 24 admitted into interior region 64 of vent housing 40, a valve-mover mount 80 included in valve position controller 48 as shown best in FIGS. 3-5 is coupled to buoyant float 50 to move up and down therewith in interior region 64 of vent housing 40 as a liquid fuel level in interior region 64 rises and falls. Valve mover 54 is coupled to valve-mover mount 80 and to port-closure valve 36 and configured to move port-closure valve 36 to the closed position (shown in FIG. 7) in response to upward movement of buoyant float 50 relative to outlet pipe 68 caused by a rising level of liquid fuel 24 in interior region 64 of vent housing 40 and to an opened position (shown in FIGS. 6 and 8) in response to downward movement of buoyant float 50 relative to outlet pipe 68 caused by a falling level of liquid fuel 24 in interior region 64 of vent housing 40. Buoyant float 50 is formed to include an upwardly opening concave channel 82 (shown best in FIG. 3) for receiving a portion of outlet pipe 68 during upward and downward movement of buoyant float 50 relative to outlet pipe 68 as suggested in FIGS. 6-8.

Valve position controller 48 includes a valve mover 54 coupled to port-closure valve 36 as suggested in FIGS. 3, 5, and 6. Valve mover 54 is formed to include cam closure means for engaging lid 60 in response to movement of liquid fuel 24 in interior region 64 of vent housing 40 toward lid 60 to move port-closure valve 36 to assume the closed position as suggested in FIG. 7. Valve mover 54 is also formed to include cam opener means for engaging an outer edge 84 of port-closure valve 36 to tilt port-closure valve 36 on valve seat 78 provided on fuel vapor discharge conduit 42 to surround conduit inlet port 43 when port-closure valve 36 is in the closed position in response to a falling level of liquid fuel 24 in interior region 64 of vent housing 40 so that a portion of port-closure valve 36 is disengaged from valve seat 78 to move port-closure valve 36 to assume the opened position to allow pressurized fuel vapor 23 extant in interior region 64 of vent housing 40 to pass through conduit inlet port 43 into vent passageway 76 formed in fuel vapor discharge conduit 42 as suggested in FIGS. 6 and 8.

Valve mover 54 includes a ball 86, a pivot sleeve 88, and a lever arm 90 arranged to interconnect ball 86 and pivot sleeve 88 as suggested in FIGS. 3 and 8. Ball 86 is received in a socket 93 formed in the port-closure valve 36 to establish a ball-and-socket joint 94 therebetween. Pivot sleeve 88 is coupled to a pivot rod 96 included in valve-mover mount 80 to establish a pivotable connection between pivot sleeve 88 and pivot rod 96 to allow valve mover 54 to pivot in a first direction about a pivot axis 196 established by pivot rod 96 to cause port-closure valve 36 to move downwardly to assume the closed position (shown in FIG. 7) upon upward movement of buoyant float 50 in interior region 64 of vent housing 40 and to allow valve mover 54 to pivot in an opposite second direction about pivot axis 196 to cause port-closure valve 36 to move upwardly to assume the opened position (shown in FIGS. 6 and 8) upon downward movement of buoyant float 50 in interior region 64 of vent housing 44.

Valve mover 54 includes a lever arm 90 having first and second ends 91, 92 and connector means for coupling first end 91 of lever arm 90 to port-closure valve 36 to allow movement of port-closure valve 36 relative to lever arm 90 during movement of port-closure valve 36 between the opened and closed positions. Valve mover 54 also includes an upper cam 101 coupled to lever arm 90 and configured to provide means for engaging a downwardly facing surface 59 of lid 60 in response to movement of second end 92 of lever arm 90 toward lid 60 to move lever arm 90 in interior region 64 of vent housing 40 relative to lid 60 and to fuel vapor discharge conduit 42 to cause port-closure valve 36 to move to assume the closed position as shown in FIG. 7. Valve position controller 48 further includes means coupled to second end 92 of lever arm 90 for moving second end 92 of lever arm 90 toward lid 60 in response to a rising level of liquid fuel 24 moving toward lid 60 in interior region 64 of vent housing 40 and in response to tilting of vent housing 40 relative to an upright position in excess of predetermined amount toward an inverted position during vehicle rollover conditions as shown, for example, in FIG. 9.

Valve mover 54 also includes a lower cam 102 coupled to lever arm 90 and configured to provide means for engaging an outer edge 84 of port-closure valve 36 facing upwardly toward lid 60 to tilt port-closure valve 36 on valve seat 78 provided on vertical vent segment 66 when port-closure valve 36 is in the closed position in response to downward movement of second end 92 of lever arm 90 away from lid 60 so that a portion of port-closure valve 36 is disengaged from valve seat 78 to move port-closure valve 36 to assume the opened position to allow pressurized fuel vapor 23 extant in interior region 64 of vent housing 40 to pass through conduit inlet port 43 into vent passageway 76 formed in fuel vapor discharge conduit 42 as shown in FIGS. 6 and 8. Valve position controller 48 further includes means coupled to second end 92 of lever arm 90 for moving second end 92 of lever arm 90 downwardly away from lid 60 in response to a falling lever of liquid fuel 24 moving away from lid 60 in interior region 64 of vent housing 40.

The invention claimed is:

1. A vent apparatus comprising
   a vent housing formed to include an interior region of a sleeve and receiving fuel vapor and liquid fuel from a vehicle fuel tank through a fuel inlet provided in the vent housing of said sleeve,
   a fuel vapor discharge conduit formed to include a conduit inlet port and a conduit outlet port, the fuel vapor discharge conduit being arranged to extend through a first conduit receiver formed in the vent housing to position the conduit inlet port to lie in the interior region of the vent housing sleeve and the conduit outlet port to lie outside the interior region of the vent housing sleeve, and
   a discharge regulator comprising
   a port-closure valve located in the interior region of the vent housing sleeve and arranged to confront the conduit inlet port and
   a valve position controller located in the interior region of the vent housing sleeve and exposed to liquid fuel admitted into the interior region through the fuel inlet, the valve position controller being coupled to the port-closure valve and configured to move the port-closure valve between an opened position allowing fuel vapor extant in the interior region to flow into a vent passageway formed in the fuel vapor discharge conduit through the conduit inlet port and exit the fuel vapor discharge conduit through conduit outlet port located outside the interior region of the vent housing sleeve when the amount of liquid fuel extant in the interior region of the vent housing sleeve falls below a predetermined amount and a closed position blocking flow of fuel vapor extant in the interior region of the vent housing sleeve into the vent passageway formed in the fuel vapor discharge conduit through the conduit inlet port when the amount of liquid fuel extant in the interior region of the vent housing sleeve exceeds the predetermined amount.

2. The apparatus of claim 1, wherein the vent housing is formed to include a second conduit receiver and the fuel vapor discharge conduit is also arranged to extend into the second conduit receiver to support the fuel vapor discharge conduit in a fixed position relative to the vent housing sleeve.

3. The apparatus of claim 2, wherein the fuel vapor discharge conduit includes a lateral tube segment arranged to extend into the second conduit receiver, a vertical vent segment coupled to the lateral tube segment and formed to include the conduit inlet port, a hose-connector segment located outside the interior region of the vent housing sleeve and formed to include the conduit outlet port, and a throat segment arranged to interconnect the lateral tube segment and the hose-connector segment and extend through the first conduit receiver formed in the vent housing sleeve and wherein the vertical vent segment, lateral tube segment, throat segment, and hose-connector segment cooperate to form the vent passageway.

4. The apparatus of claim 3, wherein the first conduit receiver is round and has a first inner diameter that is about equal to an outer diameter of a cylindrical portion of the throat segment extending through the first-conduit receiver and the second conduit receiver is round and has a smaller second inner diameter that is about equal to an outer diameter of a cylindrical portion of the lateral tube segment extending into the second conduit receiver.

5. The apparatus of claim 3, wherein the vent housing includes a sleeve formed to include the first and second conduit receivers and a lid coupled to the sleeve to close a top opening formed in the sleeve and locate the vertical vent segment in a position between the lateral tube segment and the lid, the vertical vent segment is arranged to extend in an upward direction from the lateral tube segment toward the lid and is configured to terminate at an annular valve seat surrounding the conduit inlet port and facing toward the lid, and the port-closure valve is positioned to lie between the annular valve seat and the lid.

6. The apparatus of claim 1, wherein the fuel vapor discharge conduit is mounted in a stationary position relative to the vent housing, the fuel vapor discharge conduit is formed to include an outlet pipe arranged to extend in a horizontal direction through the first conduit receiver and formed to include the conduit outlet port and a vertical vent segment coupled to the outlet pipe and formed to include the conduit inlet port and arranged to lie in perpendicular relation to the outlet pipe.

7. The apparatus of claim 6, wherein the valve position controller includes a buoyant float located in the interior region of the vent housing and configured to float in liquid fuel admitted into the interior region of the vent housing, a valve-mover mount coupled to the buoyant float to move up and down therewith in the interior region of the vent housing as a liquid fuel level in the interior region rises and falls, and a valve mover coupled to the valve-mover mount and to the port-closure valve and configured to move the port-closure valve to the closed position in response to upward movement of the buoyant float relative to the outlet pipe caused by a rising level of liquid fuel in the interior region of the vent housing and to an opened position in response to downward movement of the buoyant float relative to the outlet pipe caused by a falling level of liquid fuel in the interior region of the vent housing and wherein the buoyant float is formed to include an upwardly opening concave channel receiving a portion of the outlet pipe during upward and downward movement of the buoyant float relative to the outlet pipe.

8. The apparatus of claim 7, wherein the valve mover includes a ball, a pivot sleeve, and a lever arm arranged to interconnect the ball and the pivot sleeve and wherein the ball is received in a socket formed in the port-closure valve to establish a ball-and-socket joint therebetween and the pivot sleeve is coupled to a pivot rod included in the valve-mover mount to establish a pivotable connection between the pivot sleeve and the pivot rod to allow the valve mover to pivot in a first direction about a pivot axis established by the pivot rod to cause the port-closure valve to move downwardly to assume the closed position upon upward movement of the buoyant float in the interior region of the vent housing and to allow the valve mover to pivot in an opposite second direction about the pivot axis to cause the port-closure valve to move upwardly to assume the opened position upon downward movement of the buoyant float in the interior region of the vent housing.

9. The apparatus of claim 6, wherein the vent housing includes a sleeve formed to include the first conduit receiver and a lid coupled to the sleeve to close a top opening into the sleeve and the valve position controller includes a valve mover coupled to the port-closure valve and positioned to lie between the port-closure valve and the lid.

10. The apparatus of claim 9, wherein the valve mover includes a lever arm having first and second ends, connector means for coupling the first end of the lever arm to the port-closure valve to allow movement of the port-closure valve relative to the lever arm during movement of the port-closure valve between the opened and closed positions, and an upper cam coupled to the lever arm and configured to provide means for engaging a downwardly facing surface of the lid in response to movement of the second end of the lever arm toward the lid to move the lever arm in the interior region of the vent housing relative to the lid and to the fuel vapor discharge conduit to cause the port-closure valve to move to assume the closed position.

11. The apparatus of claim 10, wherein the valve position controller further includes means coupled to the second end of the lever arm for moving the second end of the lever arm toward the lid in response to a rising level of liquid fuel moving toward the lid in the interior region of the vent housing.

12. The apparatus of claim 10, wherein the valve position controller further includes means coupled to the second end of the lever arm for moving the second end of the lever arm toward the lid in response to tilting of the vent housing relative to an upright position in excess of predetermined amount toward an inverted position during vehicle rollover conditions.

13. The apparatus of claim 9, wherein the valve mover includes a lever arm having first and second ends, connector means for coupling the first end of the lever arm to the port-closure valve to allow movement of the port-closure valve relative to the lever arm during movement of the port-closure valve between the opened and closed positions, and a lower cam coupled to the lever arm and configured to provide means for engaging an outer edge of the port-closure valve facing upwardly toward the lid to tilt the port-closure valve on a valve seat provided on the vertical vent segment when the port-closure valve is in the closed position in response to downward movement of the second end of the lever arm away from the lid so that a portion of the port-closure valve is disengaged from the valve seat to move the port-closure valve to assume the opened position to allow pressurized fuel vapor extant in the interior region of the vent housing to pass through the conduit inlet port into the vent passageway formed in the fuel vapor discharge conduit.

14. The apparatus of claim 13, wherein the valve position controller further includes means coupled to the second end of the lever arm for moving the second end of the lever arm downwardly away from the lid in response to a falling lever of liquid fuel moving away from the lid in the interior region of the vent housing.

15. The vent apparatus of claim 1, wherein the vent housing includes a sleeve and a lid coupled to the sleeve to close a top opening into the sleeve and to cooperate with the sleeve to form the interior region and wherein the valve position controller includes a buoyant float arranged to move in the interior region of the vent housing toward and away from the lid in response to changing levels of liquid fuel in the interior region and a valve mover coupled to the port-closure valve and to the buoyant float and configured to move the port-closure valve between the opened and closed valves in response to movement of the buoyant float in the interior region of the vent housing.

16. The vent apparatus of claim 15, wherein the valve mover includes a lever arm having a first end coupled to the port-closure valve and a second end coupled to the buoyant float and an upper cam coupled to the lever arm and configured to provide means for engaging the lid in response to movement of the buoyant float in the interior region of the vent housing toward the lid to move the port-closure valve to assume the closed position.

17. The vent apparatus of claim 16, wherein the valve mover further includes a lower cam coupled to the lever arm and configured to provide means for engaging an outer edge of the port-closure valve facing toward the lid to tilt the port-closure valve on a valve seat provided on the fuel vapor discharge conduit to surround the conduit inlet port when the port-closure valve is in the closed position in response to movement of the buoyant float away from the lid so that a portion of the port-closure valve is disengaged from the valve seat to move the port-closure valve to assume the opened position to allow pressurized fuel vapor extant in the interior region of the vent housing to pass through the conduit inlet port into the vent passageway formed in the fuel vapor discharge conduit.

18. The vent apparatus of claim 15, wherein the valve mover includes a lever arm having a first end coupled to the port-closure valve and a second end coupled to the buoyant float, and wherein the valve mover further includes a lower cam coupled to the lever arm and configured to provide means for engaging an outer edge of the port-closure valve facing toward the lid to tilt the port-closure valve on a valve seat provided on the fuel vapor discharge conduit to surround the conduit inlet port when the port-closure valve is in the closed position in response to movement of the buoyant float away from the lid so that a portion of the port-closure valve is disengaged from the valve seat to move the port-closure valve to assume the opened position to allow pressurized fuel vapor extant in the interior region of the vent housing to pass through the conduit inlet port into the vent passageway formed in the fuel vapor discharge conduit.

19. The vent apparatus of claim 1, wherein the vent housing includes a lid, the valve position controller includes a valve mover coupled to the port-closure valve and formed to include cam closure means for engaging the lid in response to movement of liquid fuel in the interior region of the vent housing toward the lid to move the port-closure valve to assume the closed position.

20. The vent apparatus of claim 1, wherein the valve position controller includes a valve mover coupled to the port-closure valve and formed to include cam opener means for engaging an outer edge of the port-closure valve to tilt the port-closure valve on a valve seat provided on the fuel vapor discharge conduit to surround the conduit inlet port when the port-closure valve is in the closed position in response to a falling level of liquid fuel in the interior region of the vent housing so that a portion of the port-closure valve is disengaged from the valve seat to move the port-closure valve to assume the opened position to allow pressurized fuel vapor extant in the interior region of the vent housing to pass through the conduit inlet port into the vent passageway formed in the fuel vapor discharge conduit.

21. A vent apparatus comprising
- a vent housing formed to include an interior region bounded by a sleeve and a lid coupled to the sleeve to close a top opening into the interior region of said sleeve,
- a fuel vapor discharge conduit coupled to the sleeve and formed to include a conduit inlet port and a conduit outlet port, the fuel vapor discharge conduit including a lateral tube segment located in the interior region, a vertical vent segment coupled to the lateral tube segment and arranged to lie in the interior region to extend upwardly in a direction toward the lid to leave a space therebetween, the vertical vent segment including an annular valve seat surrounding the conduit inlet port, and a hose-connector segment located outside of the interior region and formed to include the conduit outlet port, and
- a discharge regulator including a port-closure valve positioned to lie in the interior region of the vent housing between the annular valve seat and the lid for movement toward and away from the annular valve seat and control means for moving the port-closure valve away from the lid to a closed position engaging the annular valve seat and closing the conduit inlet port to block flow of fuel vapor from the interior region of the vent housing into a vapor passageway formed in the fuel vapor discharge conduit and arranged to interconnect the conduit inlet and outlet parts in fluid communication and in a direction toward the lid to an opened position disengaging at least a portion of the annular valve seat and opening the conduit inlet port to allow fuel vapor extant in the interior region of the vent housing to flow through the conduit inlet port into the vapor passageway to be discharged from the fuel vapor discharge conduit through the conduit outlet port.

22. A vent apparatus comprising
- a vent housing having a sleeve and including a lid and formed to include an interior region of said sleeve located under the lid and receiving fuel vapor and liquid fuel in the interior region of said sleeve,
- a fuel vapor discharge conduit including a conduit inlet port located in the sleeve interior region of the vent housing, a conduit outlet port located outside the sleeve interior region of the vent housing, and a vapor passageway interconnecting the conduit inlet and outlet ports in fluid communication, and
- a discharge regulator including a port-closure valve arranged to confront the conduit inlet port and a valve mover coupled to the port-closure valve and formed to include an upper cam arranged to engage the lid during movement of the port-closure valve to assume a closed position closing the conduit inlet port and a lower cam arranged to engage the port-closure valve during movement of the port-closure valve to assume an opened position opening the port-closure valve.

* * * * *